United States Patent [19]

Ma et al.

[11] Patent Number: 5,056,898
[45] Date of Patent: Oct. 15, 1991

[54] REVERSE MODE MICRODROPLET LIQUID CRYSTAL LIGHT SHUTTER DISPLAYS

[75] Inventors: Yao-Dong Ma; Bao-Gong Wu, both of Richardson, Tex.

[73] Assignee: Polytronix, Inc., Richardson, Tex.

[21] Appl. No.: 380,973

[22] Filed: Jul. 17, 1989

[51] Int. Cl.$^5$ ................................................ G02F 1/13
[52] U.S. Cl. .......................................... 359/94; 428/1; 359/93; 359/103
[58] Field of Search ............... 350/347 V, 347 E, 334, 350/340, 350 R; 428/1; 427/213.3, 213.36

[56] References Cited

U.S. PATENT DOCUMENTS

| | | | |
|---|---|---|---|
| 4,425,029 | 1/1984 | Funada et al. | 350/338 |
| 4,435,047 | 3/1984 | Fergason | 350/347 V |
| 4,685,771 | 8/1987 | West et al. | 350/347 V |
| 4,688,900 | 8/1987 | Doane et al. | 350/347 V |
| 4,944,576 | 7/1990 | Lacker et al. | 350/347 V |

FOREIGN PATENT DOCUMENTS 0068429  6/1977  Japan ............................... 350/339 R

*Primary Examiner*—Rolf Hille
*Assistant Examiner*—Tan Ho
*Attorney, Agent, or Firm*—Dennis T. Griggs

[57] ABSTRACT

A reverse mode liquid crystal light shutter and display device is field-off transparent and field-on non-transparent (i.e., scattering and/or absorbing). The reverse phase mode is obtained by modification of the surface energy of the polymer which encases liquid crystal droplets via reaction of a surfactant, incorporated inside of the LC droplets during droplet formation, within the inside polymer layer. The reverse phase transparent "off" state is achieved by refractive index matching of the average refractive index ($\sim n_o$) of the LC droplets at electric field off state with the refractive index of the containing polymer materials and by obtaining appropriate droplet size and shape and polymer surface energy to cause the major axis of the liquid crystal molecule to be oriented perpendicular to the substrate surface. The inner surface layer aligns the liquid crystal molecules in an homeotropic manner in a resultant composite multi-layer microcapsulate with a homogeneous material for the capsule skin. A compressive force, such as obtained by rapid drying or application of external pressure, is used to provide the correct droplet shape and resulting homeotropic alignment.

15 Claims, 2 Drawing Sheets

AXIAL STRUCTURE

3-D RANDOM BIPOLAR STRUCTURE

2-D RANDOM BIPOLAR STRUCTURE

AXIAL STRUCTURE

REVERSE MODE MICRODROPLET LIQUID CRYSTAL LIGHT SHUTTER DISPLAYS

FIELD OF THE INVENTION

This invention relates generally to liquid crystal display technology and in particular to liquid crystal display devices having encapsulated liquid crystal microdroplets dispersed within a polymer matrix and operable in a reverse phase display mode.

BACKGROUND OF THE INVENTION

Liquid crystal display devices which exploit the light scattering and transmitting properties of discrete quantities of liquid crystal can be fabricated by polymerization induced phase separation of homogeneous solutions of liquid crystal and various synthetic polymers. The liquid crystal-polymeric material can be formed as a film or sheet and positioned between transparent conducting electrodes to form an electrically switchable light shutter.

Liquid crystals useful for light scattering displays have two indices of refraction: an extraordinary index of refraction $n_e$ measured along the long axis of the liquid crystals, and a smaller ordinary index of refraction $n_o$, measured in a plane perpendicular to the long axis. The long axis of the liquid crystal defines its optic axis.

In polymer dispersed liquid crystal (PDLC) devices, phase separated liquid crystal microdroplets are dispersed in a polymeric matrix having an index of refraction $n_p$. Such PDLC devices will either scatter or transmit incident light depending upon the relationship among the indices of refraction and dependent upon the microdroplets being of a size to scatter incident light, e.g., on the order of 0.1 to 10- microns.

In the absence of an applied field, the optic axes of the microdroplets have no preferred direction in which to point in the plane, so that incident light encounters a mismatch between the refraction index $n_p$ of the matrix and the average refraction index $(\sim n_e)$ of the microdroplets. The result of the mismatch is that the light is scattered and the device appears opaque. Application of an electric field across the sheet of liquid crystalline-polymeric material causes the optic axes to align parallel to the field and normal to the surface of the sheet. Incident light detects no mismatch between average refractive index of liquid crystal droplet $(\sim n_o)$ and $n_p$ and is transmitted so that the device appears clear.

DESCRIPTION OF THE PRIOR ART

Liquid crystals are currently employed in a wide variety of electro-optic display devices. The key feature of these displays centers on the ability of liquid crystals to either transmit or block (i.e., scatter and/or absorb) light dependent on the alignment of the liquid crystal molecules This alignment is controlled by the application of an electrical field and specific boundary conditions.

The first liquid crystal displays utilized liquid crystal molecules sandwiched between transparent, electrically conductive coated glass plates (i.e., a cell type display) Application of an applied voltage to the electrically conductive glass plates (i.e., electrodes) produced the desired liquid crystal realignment from an opaque state in the absence of an applied field to a transparent state in the presence of the electrical field.

In recent years, a variety of additional new liquid crystal display technologies have been developed. These new displays include microencapsulated liquid crystal [cf. Fergason, U.S. Pat. Nos. 4,435,047; 4,606,611; 4,616,903; and 4,707,080]as well as liquid crystal molecules dispersed in a solid polymer matrix (PDLC) [cf. Cartmell, U.S. Pat. Nos. 3,600,060; 3,720,623; and 3,795,529; and Doane, et al., U.S. Pat. Nos. 4,671,618 and 4,685,771]plus an all plastic liquid crystal cell display [cf. Lin and Wen, U.S. Pat. No. 4,456,638]. These PDLC devices avoid the scaling problems encountered in conventional glass cell-type displays and thus make possible the production of displays with significantly larger display areas.

The original development of PDLC involved the uniform dispersion of micron sized liquid crystal droplets in a solid polymer matrix as disclosed by B. G. Wu and W. Doane in U.S. Pat. No. 4,671,618. The original PDLC materials were prepared by the phase separation of a homogeneous solution of synthetic polymer and liquid crystals For thermoplastics, which can dissolve liquid crystals at temperatures nondestructive of the liquid crystal, the homogeneous solution is prepared by simply heating the polymer and the liquid crystal to a temperature sufficient to dissolve the liquid crystal. For thermoplastics with high destructive melting temperatures, the homogeneous solution is preferably made by first dissolving polymer and liquid crystal in a suitable solvent. The solid PDLC material is then obtained by simple solvent evaporation. Wu and Doane have provided an extensive list and evaluation of potential polymer matrices for PDLC materials along with detailed descriptions of the fabrication processes as described in U.S. Pat. 4,671,618 which is incorporated herein by reference.

The phase separation described above results in a liquid crystalline rich phase in the form of microdroplets and a plastic rich phase containing dissolved liquid crystal in solid solution. The dissolved liquid crystal alters the refractive index and the dielectric constant of the plastic solid solution By judicious choice of polymer and LC, it is possible to produce the solid phase material with widely variable LC to polymer ratios.

By proper matching of the refractive indices of the plastic matrix with that of the liquid crystals, the PDLC can be converted from a light scattering to a transparent state via application of relatively low potentials. The switching time of the material is affected by the microdroplet size. The overall optical performance of these displays depends on the relative values of the refractive index of the polymer matrix and the LC material. The index of refraction of the plastic can be adjusted to match, or to mismatch in a specified way, the ordinary index of refraction of the LC.

Conventional liquid crystal display technology involves display systems which operate in a mode referred to herein as the so-called "normal" mode or "forward" mode. In this operational mode, the liquid crystal molecular alignment is such that the display unit is opaque in the absence of an applied field (i.e., display "off"). The display becomes transparent in the presence of an applied field (i.e., display "on").

It has been recognized for some time that a reverse mode operational display could be used to good advantage in a variety of applications. In reverse mode operation, the display unit would be transparent in the absence of an applied field (i.e. display "off") and would be opaque in the presence of an applied field (i.e., display "on").

Some attempts at achieving the reverse mode liquid crystal alignment have been reported, specifically in the case of traditional glass or plastic cell type displays. In these reports, the materials (either glass or plastic) confining the liquid crystals were subjected to surfactant treatment in order to obtain surfaces which direct certain liquid crystals to align in directions which differ from those naturally obtained in the absence of surface treatment [cf. Dubois, U.S. Pat. No. 4,038,441, and Ogawa, U.S. Pat. No. 4,357,374]. The use of such surfactant treatment to modify liquid crystal alignments has, until now, been limited to two-dimensional flat surface cell displays.

SUMMARY OF THE INVENTION

The present invention involves the first demonstration of reverse mode liquid crystal alignment obtained within a three-dimensional body, specifically with encapsulated liquid crystal microdroplets dispersed within a polymer substrate.

This invention involves production of the first reverse mode microdroplet liquid crystal (RMLC) light shutter display. In this system, the display that is formed by a thin polymer film, in which liquid crystal microdroplets are dispersed, is light transmissive in the absence of an applied electrical field. The display is converted to a non-transmissive state (i.e., absorbing or scattering) when an electrical field is applied. The "off" and "on" states of this display are thus exactly opposite to that encountered in "normal" or forward mode microdroplet liquid crystal display devices.

The reverse mode operation is achieved by surfactant treatment of the polymer skin casing of the microdroplets to produce a homeotropic liquid crystal molecular alignment inside the droplets. This homeotropic alignment is obtained using liquid crystals of negative dielectric anisotropy. According to one aspect of the invention, dye molecules are incorporated in the liquid crystal microdroplets with a subsequent development of color when an electrical field is applied to this display.

THEORY OF THE INVENTION

Encapsulated liquid crystal microdroplets represent a relatively new type of light shutter display technology. In these displays, microdroplets (in the 0.5–10 micron range) are distributed uniformly in a thin film which is then sandwiched between two transparent electrodes. The microdroplets can be switched between non-transparent and transparent states by application of an electrical field.

Figure 1:
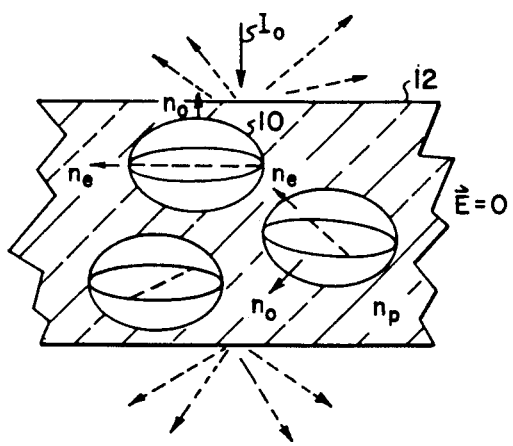
FIG. 1 is a diagrammatic view which illustrates operation of a forward mode LCD device providing scattering of light incident on a polymer substrate in which microdroplets of liquid crystal material are dispersed.

The normal arrangement of the liquid crystal microdroplets 10 in a plastic matrix 12 in the absence of an applied field is shown schematically in FIG. 1.

Figure 2:
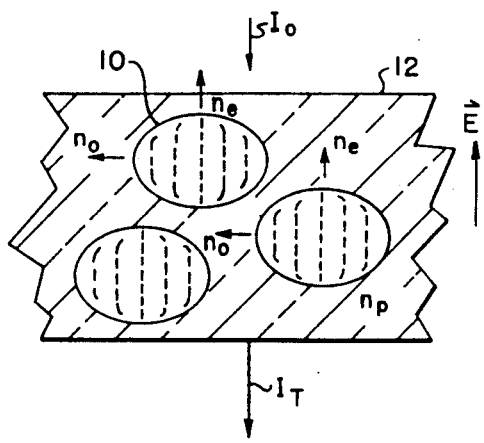
FIG. 2 is a view similar to FIG. 1 which illustrates operation of a forward mode LCD device providing transmission of light in response to the application of an electric field across the polymer substrate.

Within each droplet 10, the LC molecules have tangential wall alignment; however, there is a two dimensional random orientation of molecules in comparing various microdroplets In terms of optical properties, this corresponds to a highly light scattering state. If an electrical field $\vec{E}$ is applied as shown in FIG. 2, the orientations of molecules among various microdroplets is completely aligned. The applied electric field $\vec{E}$ aligns the directors within the droplets to a transparent state. In FIG. 1, the optic axis of the droplets 10 is indicated by $n_e$. If the ordinary refractive index of the liquid crystal, $n_o$, matches that of the polymeric matrix, $n_p$, then light scatters according to the value and orientational distribution of $n_e$. If $n_e > n_o$ and is 2-D randomly orientated (off state), light is strongly scattered. If $n_e$ is reoriented to be parallel to the direction of normally incident light, as in the case under an applied electric field, then, in priciple, no light is scattered ($n_o \sim n_p$).

Figure 3:
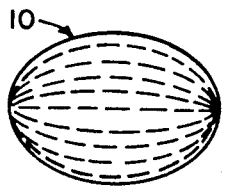
FIG. 3 is a diagrammatic view of a liquid crystal microdroplet which has been mechanically compressed to produce an ellipsoid.
Figure 4:
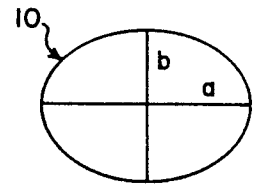
FIG. 4 is a simplified diagrammatic view, in half section, of the liquid crystal microdroplet of FIG. 3, illustrating major and minor axes.

Up to now, these droplets have always been operated in the "normal" or forward mode as shown in FIG. 1 and FIG. 2. Although the droplets 10 are fabricated as spheres, compression on the spheres when assembled in the display converts them to a somewhat elliptical spheroid shape as shown in FIGS. 3 and 4.

The properties of the microdroplets 10 are dependent on a variety of factors. If a and b are defined as the radii of the major and minor axes of the elliptical microdroplets as shown in FIG. 4, then the following factors are important in dictating liquid crystal molecular alignments:

(1) Size of the droplets: $\sqrt{a^2 b}$.

(2) Eccentricity of the droplets: $\delta = a/b$.

(3) Surface alignment: Liquid crystal molecules are either parallel or perpendicular to the droplet polymer surface encasing these molecules dependent on the degree of anchoring between the surface polymer skin and the liquid crystal molecules.

(4) Electric field: Local field effects within the droplet.

Considering the above variables, there are basically four possible liquid crystal molecular alignments within these droplets. These alignments correspond to the various permutations of droplet shape and size, boundary alignment, and liquid crystal dielectric anisotropy. These various possibilities are illustrated below in Table I in which the liquid crystal alignment is illustrated both in the presence and absence of an applied external field.

The liquid crystal alignments shown in (A) and (E) (without applied fields) are called parallel alignments, whereas those shown in (C) and (G) (again without an applied field) are called perpendicular alignments. In addition to these types of alignments, other structures such as the onion type arrangement (I) and star type array (J) are also possible, dependent on the size and shape of the droplets. These latter two structures are presently not considered important or useful in the practice of the present invention Of the eight useful liquid crystal alignments shown in Table I, structures (A) and (B) represent the liquid crystal microdroplet alignment obtained in the forward mode. Here, structure (A) represents the normal non-transmissive "off" state and structure (B) represents the normal transmissive "on" state as achieved using liquid crystals of positive dielectric anisotropy. However, up to the time of the present invention, none of the remaining six theoretically possible structures [i.e., those labeled (C) through (H)] have ever been realized as microdroplets. The present invention demonstrates for the first time that two of these additional six states can be realized, specifically structures (G) and (H).

Using liquid crystal of negative dielectric anisotropy and microdroplets 10 of an appropriate size, the production of perpendicular liquid crystal alignment has been demonstrated in the absence of an applied field as shown in (G). This transmissive "off" state is converted to the non-transmissive "on" state (H) via application of an electrical field. In view of the comparisons of "off" and "on" behavior between structures (A) and (B) and those of (G) and (H), the phrase "reverse mode" is used to describe the liquid crystal display operation in the (G) and (H) structures.

DETAILED DESCRIPTION OF THE PREFERRED EMBODIMENT

Reverse Mode Microencapsulation

In general, the microencapsulation process can be divided into three broad categories: physicochemical, chemical and physical methods. Physicochemical methods include aqueous and organic phase separations as well as spray drying methods. The aqueous phase separations are preferred for production of the desired microcapsules. In this process, the liquid crystals are suspended as a colloid in an aqueous solution of gelatin and gum arabic. The microencapsulation is achieved by a process termed coacervation. Coacervation involves the neutralization of charges on a colloid and the removal of the aqueous salvation layer around the hydrophobic colloidal particles.

Coacervation is induced when polyions of opposite charge are mixed in a ratio corresponding to electrically equivalent amounts. This is achieved with an aqueous solution of 1% alkali processed gelatin and 1% gum arabic adjusted to a pH of 4 by addition of acetic acid. At this pH the gelatin has a net positive charge and the gum arabic has a negative charge. The temperature and salt concentration must be adjusted so that coacervation can readily take place. A temperature of −40° C., the gelatin temperature of the gelatin, and a salt concentration as low as possible is ideal for the case of gelatin and gum arabic. The molecular weight and weight distribution of the polyions must also be considered; higher molecular weight polyions coacervate preferentially.

The gelatin/gum arabic coacervate deposits around the droplets of hydrophobic material suspended in the aqueous phase. The resulting membrane may be melted by heating but they can be stabilized by cross-linking the gelatin with formaldehyde. The resulting hardened microcapsules may be separated from the aqueous phase by addition of excess water followed by filtration The resulting rubbery mass of microdroplets can then be dried.

The size of the microcapsules is not uniform, varying over a wide range. The mean diameter is determined by the mechanical agitation used Increased mechanical agitation makes the size distribution narrower and sharper. The size is dependent on the relative concentration of polyions and material to be encapsulated.

The microencapsulation is performed by adding 2.5 grams of a liquid crystal to 20 mL of a 3% (by weight) solution of gum arabic. The solution is emulsified by mechanical agitation. The temperature is maintained at 50° C. and the pH adjusted to 6.5 with 20% NaOH. A 20 mL 3% (by weight) gelatin solution is added with stirring while maintaining pH and temperature. The pH is then lowered to 4.5 by the dropwise addition of dilute HCl including coacervation and coalescence of the gelatin/gum arabic around the liquid crystal/dichroic dye droplets. Two mL of formaldehyde is added to induce cross-linking of the gelatin and hardening of the microdroplets. The mixture is then cooled to 10° C. and the pH adjusted to 9 with NaOH. The mixture is diluted with 100 mL of cold water and then filtered. Excess water is removed from the microcapsules with blotting paper. The resulting mass is passed through mesh screen and dried with warm air.

The procedure presented above represents one of the approaches used in obtaining the conventional bipolar LC alignment. The same method can be employed in fabricating reverse mode microdroplets However, modifications and additional steps are required to achieve the reverse mode alignment. In principle, the surface tension of the encapsulating outer skin will theoretically force the LC to the normal bipolar alignment. The only known way a reversed mode alignment can be achieved is to subject the encapsulated droplets to a chemical treatment which changes the surface energy of the casing material after the droplet has been formed It has been determined that certain silanols are effective in brining about the desired surface energy change and thus generate reverse mode alignment The silanols are allowed to diffuse into the droplets and the resulting condensation reaction between surface—OH groups and silanol—OH results in the elimination of water and the formation of an ultra low energy surface on the inside surfaces of the casing skin. This low energy surface then leads to a reverse mode alignment of liquid crystals when a small pressure is applied to distort the molecules.

The chemical structure of the polymer should present a function group that can react with silane to form a comb-shaped copolymer. Such kinds of polymers include polyvinyl alcohol (PVA), polyacrylic acid (PAA), polystyrene-maleic anhydride and epoxy resin.

Figure 7:
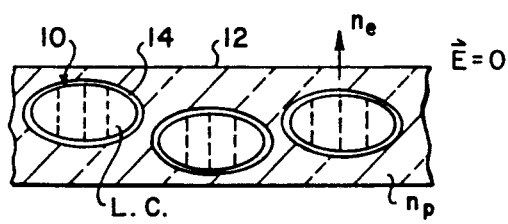

It has been demonstrated that instead of a solid matrix, isolated liquid crystal droplets can be obtained by encapsulation in a thin plastic skin 14 as shown in FIG. 7. In general, the electro-optic behavior of such encapsulated droplets 10 is identical to that reported previously for PDLC materials. However, there is an additional feature of these encapsulated droplets which is essential to this invention. Dependent on the type of polymer substrate used as the plastic casing 14 (i.e., skin), two bipolar liquid crystal molecular orientations are possible within the flattened sphere droplets which can be used to realize reverse mode operation, i.e., the configurations of Table I(G) and Table I(H).

The bipolar orientation shown in Table I(H) is similar to that depicted previously for normal PDLC droplets in a solid matrix. Microdroplets 10 synthesized using UV-curable epoxies or thermoplastics as the casing 14 (i.e., droplet skin) exhibit this type of LC orientation. The arrangement of LC molecules shown in Table I(G) in which molecules are oriented perpendicular to the long elliptical axis of the droplet can be obtained using special treatment of the casing substrate 14. This orientation is referred to as "reversed phase" droplets. The ellipsoid shape is obtained simply by applying a small pressure to the relatively easily deformed spherical droplets.

The reverse phase alignment shown in Table I(G) is of critical importance with respect to the present invention. In this case, the small pressure applied normal to the lens surface to achieve the slight droplet distortion results in alignment of the long axis of the LC normal to the lens surface and thus parallel to the incident light on the surface. In this state, the LC molecular alignment is such as to be in a completely transmissive mode despite the absence of an applied field. Optical transmission is obtained by simply matching the refractive index of the polymer skin ($n_p$) to that of the liquid crystals ($\sim n_o$). This situation is completely opposite to the normal (forward mode) operation of liquid crystals in which an applied field is required to produce molecular alignment and the transmissive "on" state.

The orientation depicted in Table I(G) represents the reverse situation in which the "on" state is achieved with no applied field. In this latter case, the applied field converts the lens from the "on" transmissive state to an "off" dispersive state. The phrase "reverse phase mode" PDLC is used to describe this latter situation. The impingement of an electric field or coherent electromagnetic radiation on a lens or window containing the reversed mode PDLC will cause a reorientation of the liquid crystal molecules from the transmissive arrangement in Table I(G) to the scattering bipolar arrangement shown in Table I(H).

The achievement of reverse mode liquid crystal molecular alignment shown in structures (G) and (H) requires that two important prerequisite conditions are met. First, the polymer skin encasing the liquid crystals must be capable of completely enclosing the liquid crystal molecules in the form of stable microdroplets. Second, the polymer skin casing must be such that it forces the liquid crystals to align homeotropically [i.e., in the perpendicular fashion shown in structure (G)] in the absence of an applied field.

However, the difficulty in achieving these two conditions simultaneously is readily understandable in terms of the Friedel-Creagh-Knetz (FCK) rule which relates liquid crystal alignment to the containing medium.

According to the FCK rule, a homeotropic alignment will be achieved only under conditions in which $\tau_p < \tau_{LC}$ where $\tau_p$ represents the surface energy of the polymer skin casing material and $\tau_{LC}$ is the liquid crystal surface free energy. If $\tau_p > \tau_{LC}$ then a homogeneous liquid crystal molecular alignment [e.g., structure (A)] results. There is, however, an inherent contradiction in terms of forming liquid crystal containing microdroplets which are simultaneously mechanically stable and, at the same time, exhibit homeotropic liquid crystal alignment. Specifically, the $\tau_p < \tau_{LC}$ requirement results in the fact that the low polymer surface energy is insufficient to completely engulf the liquid crystal molecules and thus microdroplets cannot be achieved directly during synthesis satisfying this surface energy condition.

The present invention provides a solution to this dilemma. According to the method of the present invention, the liquid crystal containing microdroplets 10 are initially formed in which the normal parallel liquid crystal alignment is obtained. This approach provides the formation of stable microdroplets since $\tau_p > \tau_{LC}$. Subsequently, after droplet formation, the inner layer of the polymer casing surface is treated with surfactant to produce the desired $\tau_p < \tau_{LC}$ and the resulting homeotropic (i.e., perpendicular) liquid crystal alignment. The surfactant responsible for this surface energy change is incorporated with the liquid crystal molecules as a dopant inside the microdroplet when it is initially formed.

Figure 5:
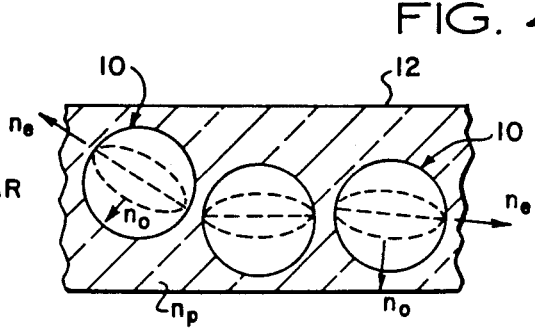
FIGS. 5, 6 and 7 illustrate liquid crystal molecular alignment changes during polymer surface modification according to the method of the present invention
Figure 6:
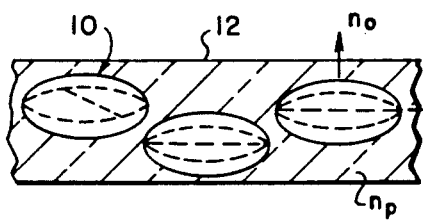

In essence, the surfactant treatment represents a grafting to the polymer surface by the dopant molecules producing a new inner surface having the required $\tau_p < \tau_{LC}$ condition. A clearer picture of the liquid crystal molecular alignment changes during this process is shown in FIGS. 5, 6 and 7. These start with the initial 3-D random bipolar structure obtained at the initial time of synthesis, followed by the 2-D random bipolar structure obtained by droplet compression followed by the desired axial structure after polymer surface modification.

Surface Energy Modification

It has been known for a long time that surface active agents can be employed to modify surface-liquid interaction energies. For example, it has been shown that homeotropic liquid crystal molecular alignment can be obtained for liquid crystals in contact with glass or conducting metal oxides by treatment of these surfaces with appropriate surfactants. The effectiveness of the surfactant treatment in achieving the desired liquid crystal alignment is a complex interaction involving, among other factors, the nature of the solid substrate, mode of application of the surfactant and the molecular composition of the liquid crystals. For example, some ionic surfactants (such as long chain substituted ammonium salts) have been shown to be effective in promoting homeotropic alignment of both negative and positive dielectric anisotropic liquid crystals. In the present invention, non-ionic surfactants are preferred so that the electrical properties of the liquid crystals will not be adversely affected.

The goal of homeotropic liquid crystal alignment inside a microdroplet is achieved by employing silane dopants of the general formula $RSiX_3$ in which X is a hydrolyzable substituent such as alkoxy, acyloxy, amine or halogen. The most common alkoxy groups employed are methoxy and ethoxy. The moxt common halogen is chloride. The R component of the $RSiX_3$ silane represents a long chain organic species whose long molecular axis provides the required surface-liquid interaction to generate the desired homeotropic alignment.

The silane induced surface modification of the casing polymer's inner surface is visualized as occurring in four steps. The initial step involves hydrolysis of the three labile X groups attached to the silicon atom:

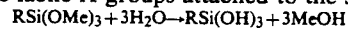

This is followed by condensation of the resulting RSi-(OH)₃ moieties to form oligomers:

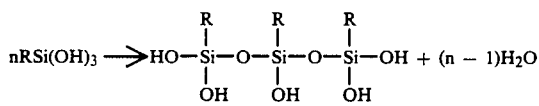

The oligomers, in turn, hydrogen bond to OH groups on the solid substrate surface as depicted below:

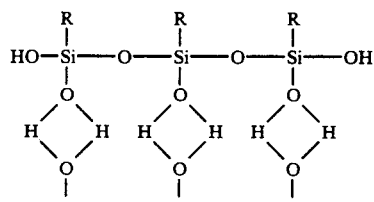

Finally, during drying or curing, a violent linkage is formed between the silanols and the solid substrate with the concommitant loss of water:

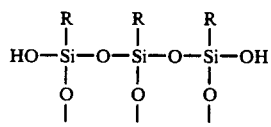

In the case of the liquid crystal microdroplets containing silane dopant, the initially formed droplets contain liquid crystals aligned in a non-homeotropic array. However, subsequent temperature curing of these droplets promotes reactions such as those described above which lead to surface modifications and ultimate homeotropic alignment as shown below:

Liquid crystals

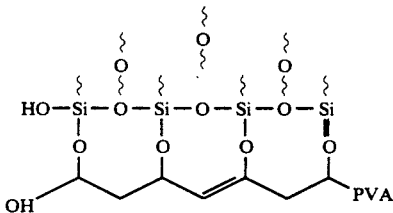

Here PVA represents polyvinyl alcohol, a suitable polymer encasing material. The R groups on the Si atoms are depicted in elongated from to emphasize their role in achieving the desired liquid crystal homeotropic alignment as shown.

A successful polymer surface modification as described above demands that the surfactant dopant molecular satisfy the following criteria:

(1) The dopants must be able to align liquid crystals of negative dielectric anisotropy effectively with a resultant tilt angle of close to 90° between the polymer skin and the liquid crystal molecules.

(2) The dopant must react chemically with the polymer skin (or deposit physically on the polymer surface) in a reasonable time period and under conditions not so harsh a to damage the encasing polymer skin or the liquid crystal molecules.

(3) The surface energy modification must be achievable within very specific dopant concentration constraints. At too low a dopant concentration, the liquid crystal alignment obtained contains many defects with resultant poor optical transmission properties. On the other hand, too high dopant concentrations adversely affect the nematic to isotropic transition temperature and also adversely increases the liquid crystal conductivity. An additional problem with high dopant concentrations if the fact that these high concentrations adversely affect the formation of the encasing polymer skin or, in some situations, eliminate the formation of stable microdroplets.

(4) The added dopant molecules should be chemically unreactive with both the liquid crystal molecules plus any dye molecules which may be present in the microdroplets. Furthermore, there should be negligible accumulations of by-products from the dopant +polymer skin reaction as these by-products would act as impurities and could adversely affect the quality of the homeotropic liquid crystal alignment obtained.

(5) The optical properties of the dopant (e.g., the refractive index) should match as closely as possible those of the liquid crystals and any added dye molecules so that the entire microdroplet will have acceptable optical uniformity.

In theory, there are a wide range of potentially acceptable dopant molecules. Any molecule which can be incorporated into the microdroplets and has the ability to adsorb and/or react with the polymer skin to produce the required surface energy to generate the homeotropic alignment will qualify as dopant. The following are examples of dopant molecules which have bee employed that satisfy the criteria mentioned above

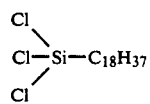 1.

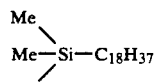 2.

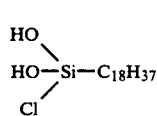 3.

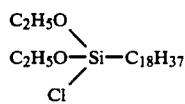 4.

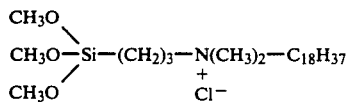 5.

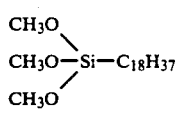 6.

-continued

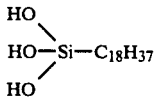
7.

These compounds are listed simply as representative of those types of molecules which have been tested and have shown to be satisfactory in achieving the homeotropic liquid crystal alignment desired Those skilled in this art will recognize that a very wide range of additional dopants will serve the desired purpose including those with varying length side-chains (i.e., hydrocarbons other than $C_{18}H_{37}$) as well as other functional groups or combinations of functional groups attached to the silicon atom.

The reverse mode liquid crystal device of the present invention is produced according to the following steps:

1. Dopant material such as silane is dissolved in the liquid crystal mixture.
2. The dopant liquid crystal is added to the water solution of polymer and emulsified to produce dispersed LC microdroplets. The droplets 10 are spherical and have a three dimensional random bipolar structure as shown in FIG. 5.
3. The emulsion then coated, spreads to the surface of ITO coated glass and is dried rapidly. By controlling drying speed, the encapsulated liquid crystal droplet 10 is "squeezed" to elliptical spheroid shape. Accordingly, the droplets 10 become two dimensional random bipolar structure as shown in FIG. 6.
4. Upon heating or high energy irradiation or other chemical and physical treatments, the dopant material diffuses to the polymer wall. Graft copolymerization then takes place. Finally, the newly formed polymer casing 14 aligns the liquid crystal homeotropically. The microdroplets 10 present an axially aligned structure as shown in FIG. 7.
5. Laminating the upper side of ITO conducting glass to provide a complete seal. Because the molecules are aligned, the droplets 10 are optically clear in the absence of an electric field. In the presence of an electric field, the droplets become randomly scattered as shown in FIG. 5, thereby rendering the device optically opaque or absorbing.

REFERENTIAL EXAMPLES

The following referential examples represent a few specific formulations and procedures involved in producing reverse mode liquid crystal microdroplets.

EXAMPLE 1

PVA [polyvinol alcohol, 100% hydrolyzed, M.W. 115,000, from Aldrich Chemical Co.]was purified using ethanol or acetone solvents after which a 9% dry weight water solution was prepared. Then, 5 g of this solution were placed in a beaker in which was inserted an IKA Ulta-Turrax Disperser T-25 stirrer capable of operating at speeds up to 8000 RPM. To this solution was added 0.45 g of liquid crystals (ZLI-2806) along with 0.0089 g of blue dye (LCD-121) and 0.0267 g of octadecyltrimethoxysilane by a syringe injection. Rapid stirring of this mixture was then carried out to achieve emulsion droplets of liquid crystal (plus dye and dopant) in PVA polymer in the micron sized range.

These microdroplets were then spin-coated to a glass surface which had been previously coated with an indium tin oxide conducting layer. The microdroplet coated glass surface was then subjected to a rapid drying step. This sample was then coated (using the 9% PVA in water solution) with this polymer coat being added to the previously dried microdroplet layer on top of the glass surface. The sample was then allowed to dry. After drying, the sample was placed in an oven at 120° C. for 20 hours during which time the condensation reaction between dopant and polymer skin casing occurs slowly producing the desired surface energy change. After the stated time period, the sample was withdrawn from the oven and allowed to cool to room temperature. At this point, it was observed that the entire assembly was clear and highly transparent.

Finally, an upper layer of indium tin oxide coated glass was fastened to this sample using Speed Bonder 319 as adhesive completing the liquid crystal display. It was observed that the application of a voltage of 45 volts converts this unit from a transparent to a highly absorbing (bright blue) display. The on-off differences were quite distinct and easily observed. It was concluded that the reverse mode was achieved as the display was light transmissive (colorless) in the absence of an applied field but brightly colored (in this case blue) and relatively nontransmissive when an appropriate voltage was applied.

EXAMPLE 2

In this example, the PVA polymer, liquid crystal material and dichroic dye were the same as in Example 1. However, in this example the silane dopant was hydrolyzed before formation of the microdroplets. This hydrolysis was carried out by adding octadecyltrimethoxysilane to 10 times its volume of deionized water in a test tube. The pH of this mixture was adjusted to 4.5 by dropwise addition to acetic acid. This mixture was then stirred vigorously for 10 minutes at 50° C. after which time the upper layer representing $(HO)_3$-$SiC_{18}H_{37}$ was removed and preserved in a refrigerator for later use.

As before, a mixture containing 0.5 g of ZLI-2806 liquid crystal material, 0.0086 g of LCD-121 dye and 0.04 g of the hydrolyzed silane were added by syringe injection to 5 g of a 9% PVA in water solution. This mixture was subjected to extremely rapid stirring until such time as microdroplets in the 1-2 micron size range were obtained. As before, this emulsion was spin coated to an ITO (indium tin oxide) coated glass substrate and allowed to dry. The sample was then coated with a top layer of the 9% PVA solution and pressure sensitive tape was used to protect the PVA polymer and microdroplets from deterioration. For this example, the sample was cured at 130° C. for 20 hours to promote the slow reaction between dopant silanol and the PVA encasing skin of the droplet.

After removal from the oven, the sample was allowed to cool to room temperature. The display assembly was then completed as before by lamination of the second ITO coated glass electrode using UV curable adhesives. As before, an excellent contrast in light transmission properties was observed in the absence and presence, respectively, of an applied electrical field with the "off" state again providing a clear, highly transmissive display (i.e., reverse mode microdroplet liquid crystal display action was achieved).

EXAMPLE 3

Eighteen grams of a 9% PVA (99-100% hydrolyzed obtained from Eastman Kodak Co.) water solution were mixed with 1 gram of ZLI-2806 liquid crystal material, 0.02 g LCD-121 blue dye and 0.07 g of the hydrolyzed silane material. This time, the mixture was stirred until such time as microdroplets in the 3-5 micron range were obtained. These 3-5 micron sized droplets were again fabricated into a display unit using the sequence of steps outlined above in Examples 1 and 2. In this particular experimental run, the dopant plus polymer substrate reaction was carried out at 130° C. for 48 hours. Again, excellent homeotropic alignment is obtained as evidenced by the good transmission of this display in the absence of an applied field. Application of an external electrical field again converted this display to a highly absorbing "on" state, in this case, the display appears bright blue in view of the LCD-121 dye employed.

EXAMPLE 4

Figure 8:
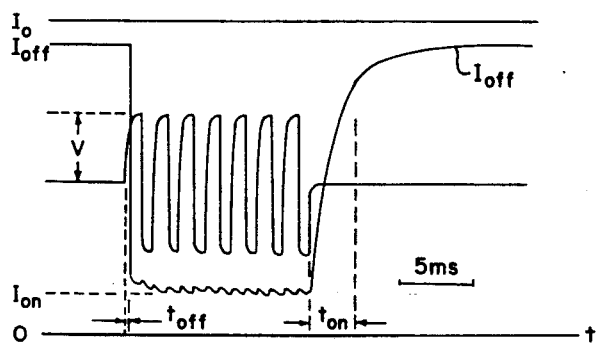
FIG. 8 illustrates the transmission light intensity and voltage response waveforms of a reverse mode liquid crystal light shutter (RMLC) constructed according to Example 4.
Figure 9:
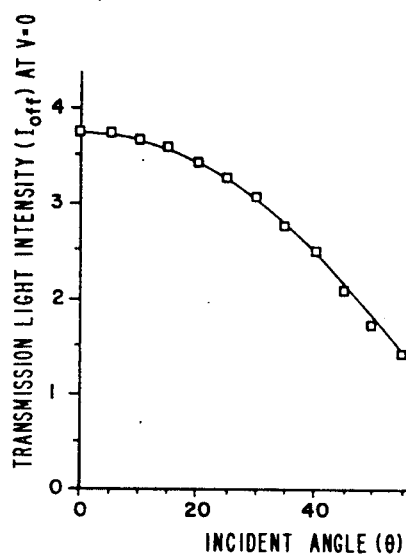
FIG. 9 illustrates the transmissive light intensity ($I_{off}$) as a function of a driving voltage V for the liquid crystal light shutter RMLC of Example 4.
Figure 10:
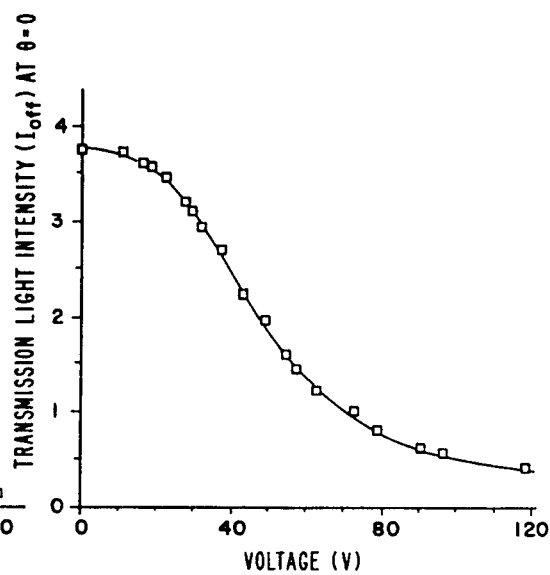
FIG. 10 illustrates the transmissive light intensity ($I_{off}$) as a function of incident angle 0 for the RMLC device of Example 4; and, FIG. 11 is a simplified diagram which illustrates the arrangement of equipment used for conducting the test of the reverse mode liquid crystal shutter RMLC of Example 4.
Figure 11:
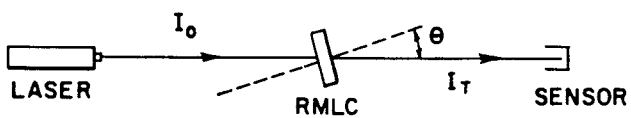

In this example, PAA (polyacrylic acid), average molecular weight 250.000, is used. A polymer mixture of 11 grams of 12% PAA water solution and 2 grams of 10% PVA water solution was prepared. The liquid crystal was a mixture of 0.6 grams of Licristal N5 (TN) and 0.4 grams of ZLI2806 with 0.073 grams of the hydrolyzed silane dissolved but without dichroic dye. Then the polymer solution and the liquid crystal were emulsified to the droplet size around 1 micron. The subsequent process was the same as Example 2. Excellent scattering "on state" was obtained when the electric field was applied. The contrast ratio $C_r$ was 7.2 and the light transmission ratio T was 92%. Representative waveforms showing tests results are given in FIGS. 8, 9 and 10. The optical test arrangement is illustrated in FIG. 11. Test values: $I_o=4.74$, $I_{on}=4.36$, $I_{off}=0.60$, $t_{on}=0.2$ ms, $t_{off}=3.2$ ms, V = 180 volts.

Terminology:
V driving voltage on the RMLC
$I_o$ incident light intensity
I transmissive light intensity
$I_{off}$ I at voltage "off" state (V=0)
$I_{on}$ I at voltage "on" state
$t_{off}$ response time from transmissive state to 90% opaque state
$t_{on}$ response time from opaque state to 90% transmissive state
$\theta$ incident angle of laser beam
Cr contrast ratio = $I_{off}/I_{on}$
T transmission ratio = $I_{off}/I_o$ at V=0

As illustrated in the above examples, the weight ratio of polymer: liquid crystal: dye: silane dopant was approximately in the range of 1.0 1.5 : 1 : 0.02 : 0.02 0.08. The ratio of polymer to liquid crystal exerted a substantial influence on the shape of the droplets obtained. The ratio of liquid crystal to silane affected the thickness and uniformity of the inner surface alignment layer. The exact ratio of liquid crystal to dopant silane for optimum alignment depended on the pressure, reaction temperature and reaction time and the amount of oxygen present. It is expected that significant variations in these ratios may be employed dependent on these various reaction variables. It ha been determined that the droplet shape represents a key factor in the ultimate display performance. Higher molecular weight polymers, different fast drying techniques and higher water concentration in the droplets can lead to droplets which are more flattened in shape. These flattened droplets tend to exhibit a more transparent (i.e., more homeotropic liquid crystal alignment) "off" state.

The above weight ratios and reaction conditions have been provided for illustration purposes. As those skilled in the art will recognize, it is likely that acceptable reverse mode liquid crystal microdroplets can be produced using reactant ratios and conditions different from those described above.

TABLE I

Possible liquid crystal alignment inside the microdroplets as functions of droplet shape, liquid crystal anisotropy and absence or presence of an applied external field

| Dielectric Anisotropy ($\epsilon\|\| - \epsilon\perp$) | Droplet Shape (a/b) | E = 0 (no external field) | ↑ E (applied external field) |
|---|---|---|---|
| positive | a > b | (A) | (B) |
| positive | a < b | (C) | (D) |
| negative | a < b | (E) | (F) |
| negative | a > b | (G) | (H) |
| | | (I) | (J) |

What is claimed is:

1. A liquid crystal light shutter device capable of transmitting and scattering light comprising, in combination:
   a substrate of optically transparent polymer material;
   droplets of liquid crystal material dispersed in said polymer substrate, said droplets being effective to transmit incident light when the optical axes of said droplets are aligned substantially in parallel with incident light, wherein each droplet is encapsulated within a skin of heterotrophic polymer material and each encapsulated droplet being substantially in the form of an ellipsoid, with the liquid royal molecules within each droplet being aligned homeotropically in the absence of an applied electric field.

2. A liquid crystal light shutter device as defined in claim 1, wherein the polymer skin encapsulating material is characterized by a surface energy value which is less than the surface free energy value of the liquid crystal material.

3. A liquid crystal light shutter device as define din claim 1, wherein said heterotrophic encapsulating material is a polymer compound selected for the group consisting of polyvinyl alcohol, polyacrylic acid and polystrenemaleic anhydride.

4. A liquid crystal light shutter device as define din claim 1, wherein said encapsulated liquid crystal droplets are produced by mixing the liquid crystal material with the heterotrophic polymer encapsulating material and a homeotropic surfactant, with the droplets being cured to a yield a blend of liquid crystal and homeotropic surfactant separated from the heterotropic polymer encapsulating material and the surfactant being grafted to the heterotropic polymer material, thereby yielding liquid crystal droplets having a homeotropic molecular alignment, with each droplet being encapsulated within a heterotropic polymer outer skin and a homeotropic surfactant inner layer.

5. A liquid crystal light shutter device as defined in claim 4, wherein said homeotropic surfactant comprises silane.

6. A liquid crystal light shutter device as defined in claim 4, wherein said homeotropic surfactant comprises silane having the general formulation $RSiX_3$ where X is a hydrolyzable substituent selected form the group consisting of alkoxy, acyloxy, amine and halogen, and where R is a on chain organic material.

7. A liquid crystal light shutter device as defined in claim 1, wherein he polymer encapsulating skin and the liquid crystal material each having a refractive index, respectively, the refractive index of the polymer skin encapsulating said droplets being matched optically with the refractive index of said liquid crystal material.

8. A liquid crystal light shutter device as defined in claim 1, wherein said polymer skin is a composite skin consisting essentially of an inner layer of homeotropic surfactant, and an outer layer of heterotropic polymer.

9. A method for encapsulating droplets of liquid crystal material comprising the steps:
   mixing liquid crystal material with a heterotrophic polymer and a homeotropic surfactant;
   encapsulating a composite droplet of liquid crystal and homeotropic surfactant within a layer of said heterotrophic polymer;
   curing said encapsulated droplet of liquid crystal and surfactant mixture to cause the surfactant to separate from the liquid crystal droplet and the heterotrophic polymer coating, thereby yielding a liquid crystal droplet encapsulated within a composite skin consisting essentially of an inner layer of surfactant and an outer layer of heterotrophic polymer.

10. A method for encapsulating liquid crystal droplets comprising the steps:
    mixing liquid crystal material with a heterotrophic polymer material and a heterotrophic surfactant;
    emulsifying said mixture to produce dispersed droplets of liquid crystal and surfactant which are encapsulated within a skin of the heterotrophic polymer material; and,
    curing said dispersed droplets to cause diffusion of the surfactant to the heterotrophic polymer encapsulating layer and to effect graft copolymerization of the heterotrophic polymer encapsulating layer.

11. The emulsifying method as defined in claim 10, including the step:
    controlling the rate of curing of said droplets to cause said encapsulated liquid crystal droplets to assume a substantially ellipsoid shape.

12. The encapsulating method as defined in claim 10, wherein aid homeotropic surfactant comprises silane having the general formulation $RSiX_3$, where X is a hydrolyzable substitute selected from the group consisting of alkoxy, acyloxy, amine and halogen, and where R is a long chain organic material.

13. The encapsulating method as define din claim 10, wherein said homeotropic encapsulating material is a polymer compound selected form the group consisting of polyvinyl alcohol, polyacrylic acid and polystyrene-maleic anhydride.

14. A method for producing a liquid crystal display device comprising the steps:
    encapsulating liquid crystal droplets within a polymer skin having a surface energy value which is less than the liquid crystal surface free energy value;
    modifying the polymer skin surface with a surfactant to reduce the surface energy value of the polymer skin encapsulating material to a value less than said liquid crystal surface free energy value;
    dispersing the encapsulated liquid crystal droplets within a polymer matrix; and,
    curing said dispersed mixture.

15. A method as defined in claim 14, including the step of physically deforming said droplets within said polymer matrix.

* * * * *

UNITED STATES PATENT AND TRADEMARK OFFICE
CERTIFICATE OF CORRECTION

PATENT NO. : 5,056,898

DATED : October 15, 1991

INVENTOR(S) : Yao-Dong Ma; Bao-Gong Wu

It is certified that error appears in the above-identified patent and that said Letters Patent is hereby corrected as shown below:

Column 1, line 36, "10- microns" should be -- 10 microns --.

Column 1, line 62, "display)" should be -- display). --

Column 2, line 5, "4,707,080]as" should be -- 4,707,080] as --.

Column 2, line 9, "4,685,771]plus" should be -- 4,685,771] plus --.

Column 2, line 22, "liquid crystals For" should be -- liquid crystals. For --.

Column 2, line 42, "solution By" should be -- solution. By --.

Column 2, line 67, "(i.e. display" should be -- (i.e., display --.

Column 3, line 61, "invention" should be -- invention; --.

Column 4, line 24, "microdroplets In" should be -- microdroplets. In --.

Column 4, line 53, "$\delta = a/b$" should be -- $\epsilon = a/b$ --.

Column 5, line 50, "salvation" should be -- solvation --.

Column 6, line 4, "filtration The" should be -- filtration. The --.

UNITED STATES PATENT AND TRADEMARK OFFICE
CERTIFICATE OF CORRECTION

PATENT NO. : 5,056,898

DATED : October 15, 1991

INVENTOR(S) : Yao-Dong Ma; Bao-Gong Wu

It is certified that error appears in the above-identified patent and that said Letters Patent is hereby corrected as shown below:

Column 6, line 9, "used Increased" should be -- used. Increased --.

Column 6, line 34, "microdroplets However" should be -- microdroplets. However --.

Column 6, line 45, "alignment The" should be -- alignment. The --.

Column 7, line 53, "(G)]in" should be -- (G)] in --.

Column 7, line 64, "(A)]-" should be -- (A)] --.

Column 8, line 58, "moxt" should be -- most --.

Column 9, line 24, "violent" should be -- covalent --.

Column 10, line 2, "harsh a to" should be -- harsh as to --.

Column 10, line 38, "bee" should be -- been --.

Column 11, line 10, "desired Those" should be -- desired. Those --.

Column 11, line 54, "Co.]was" should be -- Co.] was --.

Column 12, line 24, "nontransmissive" should be -- non-transmissive --.

Column 13, line 65, "It ha been" should be -- It has been --.

UNITED STATES PATENT AND TRADEMARK OFFICE
CERTIFICATE OF CORRECTION

PATENT NO. : 5,056,898

DATED : October 15, 1991

INVENTOR(S) : Yao-Dong Ma; Bao-Gong Wu

It is certified that error appears in the above-identified patent and that said Letters Patent is hereby corrected as shown below:

Column 14, lines 11-27, the drawing figures have been omitted from TABLE I. A drawing sheet showing TABLE I as originally filed is attached hereto.

Column 14, line 41, "royal" should be -- crystal --.

Column 14, line 50, "define din" should be -- defined in --.

Column 14, lines 53-54, "polystrenemaleic" should be -- polystyrene-maleic --.

Column 14, line 55, "define din" should be -- defined in --.

Column 15, line 7, "form" should be -- from --.

Column 15, line 9, "is a on chain" should be -- is a long chain --.

Column 15, line 11, "wherein he" should be -- wherein the --.

Column 16, line 13, "wherein aid" should be -- wherein said --.

Column 16, line 15, "substitute" should be -- substituent --.

Column 16, line 18, "define din" should be -- defined in --.

UNITED STATES PATENT AND TRADEMARK OFFICE
CERTIFICATE OF CORRECTION

PATENT NO. : 5,056,898

DATED : October 15, 1991

INVENTOR(S) : Yao-Dong Ma; Bao-Gong wu

It is certified that error appears in the above-identified patent and that said Letters Patent is hereby corrected as shown below:

Column 16, line 20, "form" should be -- from --

Signed and Sealed this

Thirty-first Day of May, 1994

Attest:

BRUCE LEHMAN

Attesting Officer Commissioner of Patents and Trademarks